United States Patent Office 3,024,642
Patented Mar. 13, 1962

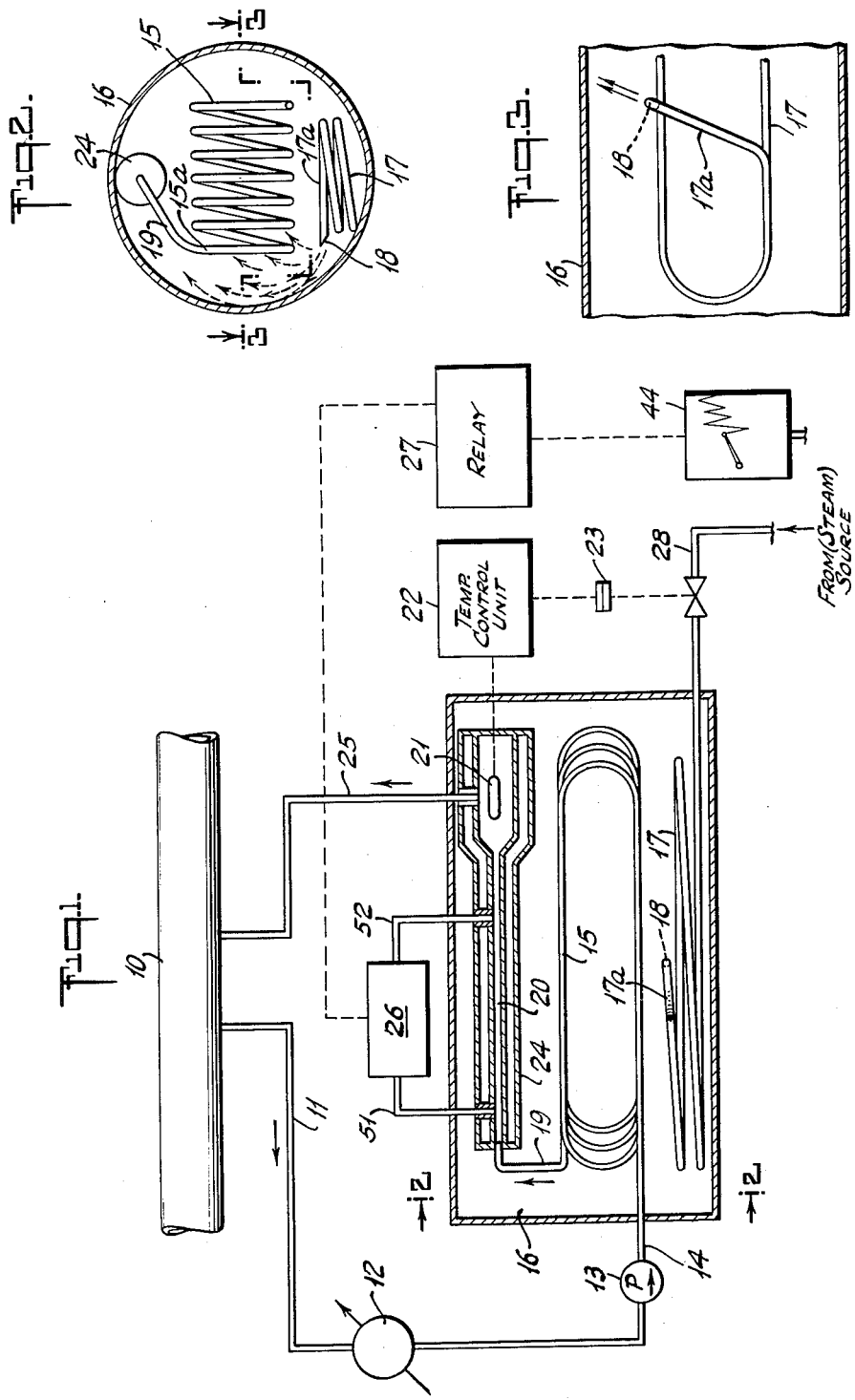

3,024,642
VISCOSIMETER
James M. Jones, Jr., Port Arthur, Tex., assignor to Texaco Inc., a corporation of Delaware
Filed July 29, 1957, Ser. No. 674,794
4 Claims. (Cl. 73—54)

This invention relates to an apparatus for automatically and continuously determining the viscosity of a fluid, such, for example, as a lubricating oil.

This application is a continuation-in-part of my application Serial No. 507,853 filed May 12, 1955, now Patent No. 2,988,914.

It is well known that the viscosity of oil can be accurately determined by measuring the differential in pressure in a system obtained when a fluid is pumped through that system, providing the flow-rate and flow-temperature are kept constant. Constant flow rate is not difficult to maintain but slight fluctuations in temperature sometimes are difficult to prevent. In such a system it is necessary that the temperature be held constant or that some immediate automatic compensation be made for its deviation from the constant since slight fluctuations in the temperature affect viscosity.

The present invention meets this need by providing both thermo-insulating means surrounding that section of the system across which the differential pressure is sensed, and a temperature responsive heating device in an apparatus for continuously determining the viscosity of a fluid. Thus, the viscosity of a liquid at constant flow-rate and constant temperature is continuously and accurately measured while maintaining a constant temperature across the place of differential pressure measurement.

Referring to the drawings:

FIG. 1 is a schematic delineation of the system utilized in the performance of my invention.

FIG. 2 is a cross sectional view taken along the line 2—2 in FIG. 1 particularly showing means to discharge steam or the like against the cylinder walls; and FIG. 3 is a fragmentary sectional view taken along the line 3—3 in FIG. 2.

In FIG. 1 there is shown a flow-line 10 which may be a pipe line or, as here, a line through which a stream of lubricating oil is drawn from a fractionating tower to tankage (not shown). A small fluid takeoff pipe 11 connecting the flow-line with a cooler 12 provides a means for continuously withdrawing a relatively smaller sample stream of oil from the larger line 10 and passing it to the thermostatically controlled cooler 12 wherein the temperature of the oil flow is reduced to a temperature slightly (e.g. 10–20° F.) below that at which it is desired to measure the viscosity of the oil, as described in my copending application Serial No. 647,310 filed March 20, 1957. From cooler 12 the oil is pumped at a constant rate by pump 13 through pipe 14 to heat exchange coil 15 positioned in a horizontal, cylindrical heating bath 16, filled with water or other bath liquid the purpose of which is to reheat the oil to the desired temperature and maintain that temperature as near to constant as possible. Heat is supplied to the cylindrical bath 16 through steam coil 17 positioned within the bath liquid along the bottom of the bath and discharging into the bath liquid. Excess bath liquid is withdrawn through an outlet (not shown). A fairly light load is imposed on the heating coil 15 with this arrangement, thus making possible a close approach between the temperature of the water bath and the oil leaving the heating coil and entering a pressure differential measuring tube 20.

Surprisingly constant temperature control has been obtained in practise by arranging a continuous pipe 15 in a series of elongated narrow loops having flat sides, each loop extending lengthwise of the cylindrical bath 16, adjacent loops being arranged across the center of the bath, desirably along its horizontal diameter as an axis, in side-by-side uniformly spaced relationship as shown in FIG. 2.

The heating fluid, such as steam, is supplied to a continuous pipe 17 which comprises a series of elongated spaced loops arranged in the space between the coil 15 and a side wall of bath 16, advantageously opposite jacket 24 and below coil 15. Heating pipe 17 coils inwardly from the wall of bath 16 toward coil 15 and terminates in a discharge orifice 18 which is located about one inch from the wall of bath 16 adjacent, and preferably below, the center of the side loop 15a nearest outlet conduit 19. Orifice 18 is arranged to discharge heating fluid through the water of the bath 16 and against the side wall thereof at a point opposite the loop 15a so as to swirl around the cylindrical wall and create a continuous circulation of the hot bath liquid through the loops of, within and around, the pipe coil 15, and around the jacket 24 whereby uniform heating is achieved at all times.

For best circulation, the discharge end 17a of coil 17 is parallel to the plane of the adjacent side portions of coil 15, and is inclined at a small angle such as 5–15° to a chord passing through orifice 18. Thus both rotational and lengthwise components are present, resulting in spiral rotation of the steam and bath water within the cylindrical shell of bath 16.

Another important feature is that as steam passes through coil 17, it partially condenses so that there is a pulsating discharge through orifice 18 in the form of alternate slugs of condensate followed by steam. This provides better circulation than would be obtained from a uniformly applied force.

From heat exchange coil 15 the oil passes through pipe 19 to a jacketed calibrated tube 20. A temperature responsive element 21 is located at the discharge end of jacketed tube 20 which senses temperature variations in the oil and transmits to a temperature-control element 22 which in turn operates a flow-control valve 23 in a steam line 28 leading to heating coil 17. This is a much preferred feature of the invention because when the temperature-responsive element 21 is in this preferred location the temperature of the fluid may be effectively controlled.

The jacket 24 surrounding the tube 20 is an air-tight enclosure in which a vacuum is produced. The vacuum-surrounded tube 20 is an important part of my invention used to minimize temperature variations in the oil flowing through the tube. After leaving the jacketed tube the oil is returned through a pipe 25 to the flow-line 10, discharging into the line 10 at a point near the point at which the stream was originally withdrawn. A differential pressure sensing element 26 which is connected across the opposite ends of the calibrated portion of the jacketed tube 20 by connecting lines 51 and 52 is provided to detect any pressure change across the tube 20 which may result from changes in the viscosity of the flowing oil.

An impulse from this sensing element 26 is conducted to a relay broadly designated as 27 which actuates an indicating device 44. Reference is made to my Patent 2,791,902, and copending application Serial No. 507,853.

Obviously, many modifications and variations of the invention, as hereinbefore set forth, may be made without departing from the spirit and scope thereof and, therefore, only such limitations should be imposed as are indicated in the appended claims.

I claim:

1. Apparatus for measuring the viscosity of a liquid comprising, in combination, a cylindrical bath tank adapted to contain a bath liquid; a viscosimeter tube in said tank in position to be immersed in such bath liquid; first means for measuring pressure drop across said viscosimeter tube as an indication of viscosity; second means for feeding to said viscosimeter tube a stream of liquid whose viscosity is to be measured, said second means comprising a constant volume pump and a first heat exchange tube connecting said pump to said viscosimeter tube, said first heat exchange tube being a long narrow coil located within said tank and extending lengthwise thereof in position to be immersed in such bath liquid; and third means for heating the bath liquid in said bath tank comprising a long narrow coiled second heat exchange tube for heating fluid, arranged within said tank, extending lengthwise thereof and having an orifice opening into said tank in position to discharge heating fluid directly into said tank for heating the bath liquid, said orifice being arranged close to the cylindrical wall of said tank in position to discharge heating fluid against said wall so as to swirl around within said tank and produce circulation of the bath liquid around said first heat exchange tube and said viscosimeter tube.

2. Apparatus in accordance with claim 1 wherein said second heat exchange tube and orifice are arranged to discharge heating fluid at an acute angle with respect to a chord of said cylindrical tank passing through said orifice, to produce spiral rotation of said heating fluid and bath water within said tank.

3. In apparatus for measuring the viscosity of a liquid comprising, in combination, a bath tank adapted to contain a bath liquid; a viscosimeter tube in said tank in position to be immersed in such bath liquid; first means for feeding to said viscosimeter tube a stream of liquid whose viscosity is to be measured, said first means comprising a constant volume pump and a first heat exchange tube connecting said pump to said viscosimeter, said first heat exchange tube being located within said tank in position to be immersed in such bath liquid; and second means for heating the bath liquid in said bath tank: the improvement wherein said first heat exchange tube is arranged centrally within said tank, wherein said viscosimeter tube is arranged on one side of said first heat exchange tube, and wherein said second means for heating the bath liquid comprises a second heat exchange tube for heating fluid arranged within said tank on the opposite side of said first heat exchange tube and having an orifice opening into said tank in position to discharge heating fluid directly into said tank for heating the bath liquid and for inducing circulation of such bath liquid around said first heat exchange tube and said viscosimeter tube.

4. In apparatus in accordance with claim 3, said bath tank being cylindrical in shape, both of said heat exchange tuebs being long narrow coils extending lengthwise within said tank, said orifice of said second heat exchange tube being arranged close to the cylindrical wall of said tank in position to discharge heating fluid against said wall so as to swirl around within said tank and induce circulation of the bath liquid.

References Cited in the file of this patent

UNITED STATES PATENTS

| 344,562 | Brunler | June 29, 1886 |
| 2,266,947 | Arndt | Dec. 23, 1941 |
| 2,322,814 | Binckley | June 29, 1943 |
| 2,372,533 | Torbett | Mar. 27, 1945 |
| 2,389,488 | Dailey | Nov. 20, 1945 |
| 2,492,253 | Wobser et al. | Dec. 27, 1949 |
| 2,596,812 | Carson | May 13, 1952 |
| 2,705,420 | Bryan et al. | Apr. 5, 1955 |
| 2,791,902 | Jones | May 14, 1957 |

FOREIGN PATENTS

| 657,696 | Great Britain | Sept. 26, 1951 |